United States Patent [19]
Biggs et al.

[11] Patent Number: 5,504,920
[45] Date of Patent: Apr. 2, 1996

[54] VIDEO DRIVER SYSTEM FOR COMMUNICATING DEVICE SPECIFIC PRIMITIVE COMMANDS TO MULTIPLE VIDEO CONTROLLER TYPES

[75] Inventors: Kent E. Biggs, Tomball; Mark A. Lobodzinski, Houston, both of Tex.

[73] Assignee: Compaq Computer Corporation, Houston, Tex.

[21] Appl. No.: 242,773

[22] Filed: May 16, 1994

[51] Int. Cl.$^6$ .................................................. G06F 9/40
[52] U.S. Cl. .................. 395/800; 364/237.1; 364/237.3; 364/254.8; 364/261.3; 364/DIG. 1; 395/700
[58] Field of Search ..................................... 395/800, 700, 395/500

[56] References Cited

U.S. PATENT DOCUMENTS 4,779,187  10/1988  Letwin .
4,885,703  12/1989  Deering .................................. 395/122
5,109,504   4/1992  Littleton ................................ 395/500
5,257,097  10/1993  Pineau ................................... 358/500

*Primary Examiner*—Eric Coleman
*Attorney, Agent, or Firm*—Vinson & Elkins

[57] ABSTRACT

A method and system for accommodating multiple video controllers. The method includes communicating a plurality of primitive commands to a video controller having a configuration of a predetermined type. Further, the method includes electronically determining the type of the configuration, and generating a vector table comprising a plurality of device-specific routines. Each entry in the vector table may point to a device-specific routine for hardware acceleration of a primitive command or to a default routine which sets the video controller in a specific mode which can be operated by a set of colordepth-specific routines which operate on any video controller set to the specific mode. In response to a primitive from the operating environment, common code, which is device and colordepth independent, will access a routine via the vector table. If the vector table does not access a hardware accelerated routine, colordepth specific code is used to execute the primitive.

14 Claims, 5 Drawing Sheets

VIDEO DRIVER SYSTEM FOR COMMUNICATING DEVICE SPECIFIC PRIMITIVE COMMANDS TO MULTIPLE VIDEO CONTROLLER TYPES

This invention relates to computers, and is more particularly directed to a video driver for accommodating multiple video controllers.

BACKGROUND OF THE INVENTION

As the computer industry advances, video hardware is constantly updated and improved, including and necessitating the advancement of hardware video controllers. Consequently, software drivers must also adjust to support the evolution of such hardware controllers. The present invention addresses the need for supporting such controllers, and preferably accomplishes this problem using a single software driver.

Under known prior art systems, an entire software driver is developed for each new corresponding hardware controller. Often, the software developer obtains a standardized software driver and modifies it to support the new hardware. Such a standardized software driver is typically available from either the hardware developer, or from the manufacturer of the operating system or environment which will communicate with the improved hardware. As an example with respect to many contemporary personal computers, MICROSOFT of Redmond, Wash., currently sells a device driver kit to communicate with its WINDOWS environment. This driver may be modified to allow communication between WINDOWS and a specific hardware controller.

Most controllers operate at selectable color depths and resolutions. A color depth defines how many unique colors may be output from a video controller at any one time. For example, to support 256 colors, a color depth of 8 BPP (Bits Per Pixel) is necessary. To support 65K colors, a color depth of 16 BPP is necessary. Resolution defines how many pixels are output to the display device. Standard VGA has a resolution of 640×480 pixels, while enhanced VGA modes include 800×600, 1024×768 and 1280×1280. In the prior art, a separate driver is necessary for each combination of color depth and resolution.

The above approach of providing multiple drivers for different video controllers (and controller modes) suffers several drawbacks. For example, development of a new driver for each new device vastly increases the necessary resources and time in bringing the combination of new controller/new driver to market. Further, troubleshooting and debugging are complicated because the driver-specific code for primitive commands often must be fully completed before the driver can be tested. Still further, each time a new controller is developed, the entire process must be repeated.

It is therefore an object of the present invention to provide a video driver for accommodating multiple video controllers.

It is a further object of the present invention to provide such a video driver for use with the WINDOWS environment.

It is a further object of the present invention to provide such a video driver to minimize developmental time and resources needed as new video controllers are developed.

It is a further object of the present invention to provide such a video driver that may evaluate the type of video controller with which it is communicating and identify which primitive commands may be accelerated by the controller.

It is a further object of the present invention to provide such a video driver that may selectively choose which primitive commands are accelerated by the controller.

Still other objects and advantages of the present invention will become apparent to those of ordinary skill in the art having references to the following specification together with its drawings.

SUMMARY OF THE INVENTION

In the preferred embodiment, the present invention includes a method and system for accommodating multiple video controllers. A vector table is generated which links a plurality of function calls to corresponding routines. After electronically determining information related to the video controller and its current display mode, the vector table is modified such that certain of said function calls point to device-specific routines for performing hardware accelerated video operations and other of said function calls point to a routine for setting the video controller in a predetermined mode.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

The preferred embodiment of the present invention and its advantages are best understood by referring to FIGS. 1–8 of the drawings, like numerals being used for like and corresponding parts of the various drawings.

Figure 1:
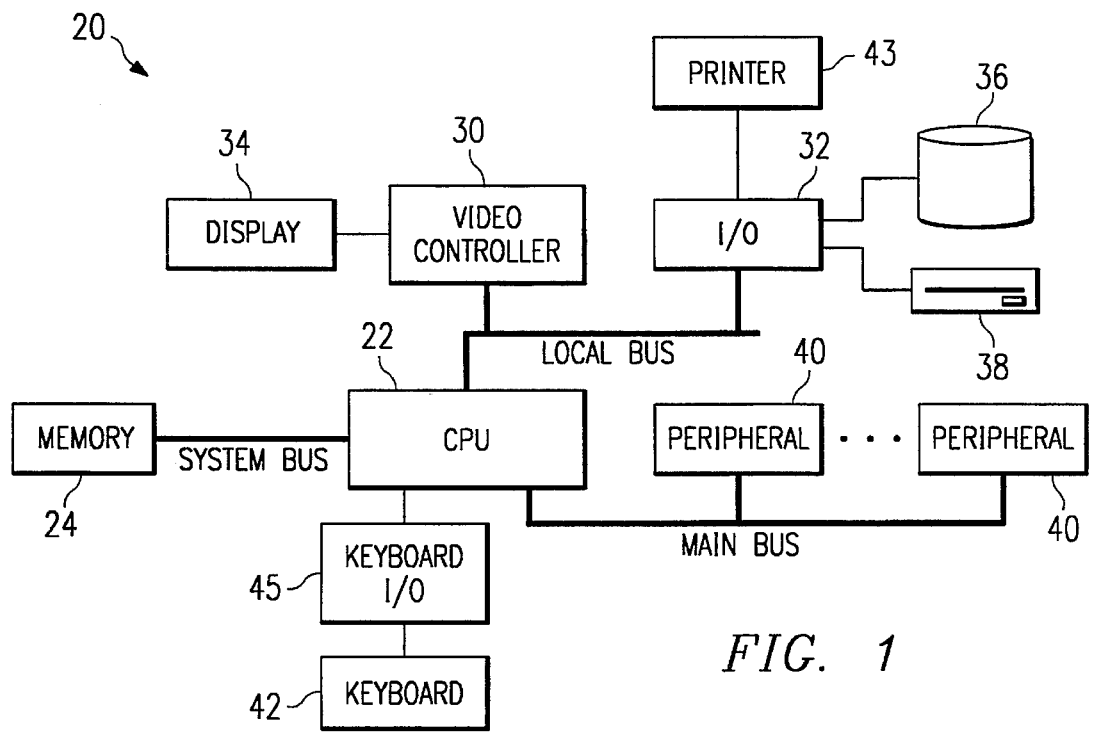
FIG. 1 illustrates a simplified block diagram of a computer system.
Figure 2:
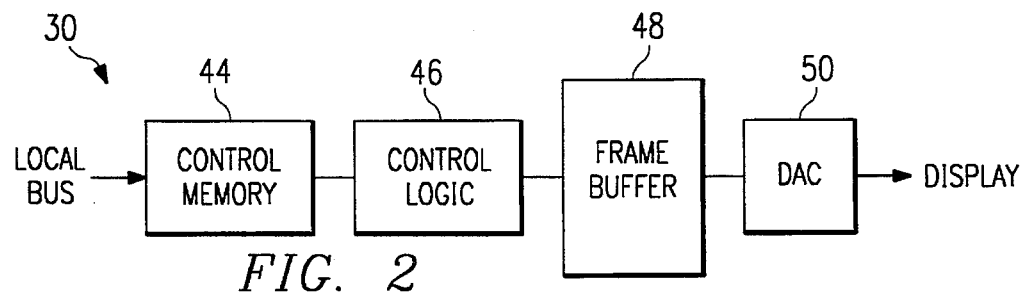
FIG. 2 illustrates a simplified block diagram of a video controller.

FIG. 1 illustrates a block diagram of a computer system 20. The computer system 20 includes a microprocessor (or central processing unit) 22, coupled to a memory 24, a local bus 26 and a main peripheral bus 28. A video controller 30 and I/O circuitry 32 are coupled to the local bus 26. A display 34 is coupled to the video controller 30. A hard disk 36 and floppy disk 38 are coupled to the I/O circuitry 32. A plurality of peripherals 40 are coupled to the main bus 28. A keyboard 42 is coupled to the CPU 22 through keyboard interface 45. A printer 43 is also coupled to I/O circuitry 32. The computer system 20 of FIG. 2 is an exemplary embodiment for a high performance computer system. Many computer systems vary from the architecture shown in FIG. 2, and the invention described herein would apply to various architectures. Further, the architecture shown in FIG. 2 is a basic architecture and many of the details have been removed for illustrative purposes.

FIG. 2 illustrates a more detailed block diagram of the video controller 30. The video controller 30 comprises a memory section 44, including control registers and buffers, a state machine 46 coupled to the memory section 44 and a frame buffer 48. The frame buffer 48 is connected to a digital-to-analog converter (DAC) 50 which outputs video information to the display 34 responsive to the data stored in frame buffer.

The video driver is loaded into the computer system 20 from the hard disk 36 at runtime along with the operating environment, such as WINDOWS, and is executed by the CPU 22. In operation, the video driver, responsive to instructions from the operating environment, outputs data and control signals to the video controller 30. Responsive to the data and control signals, the state machine 46 controls the flow of data to and from the frame buffer 48.

The present invention allows a single video driver to be used to drive any one of a plurality of different controllers at any one of a plurality of color depths. Initially, only a single hardware-specific routine must be provided to the controller to initiate testing of the controller. Additional routines can be added to support hardware acceleration features of a particular card as desired.

Figure 3:
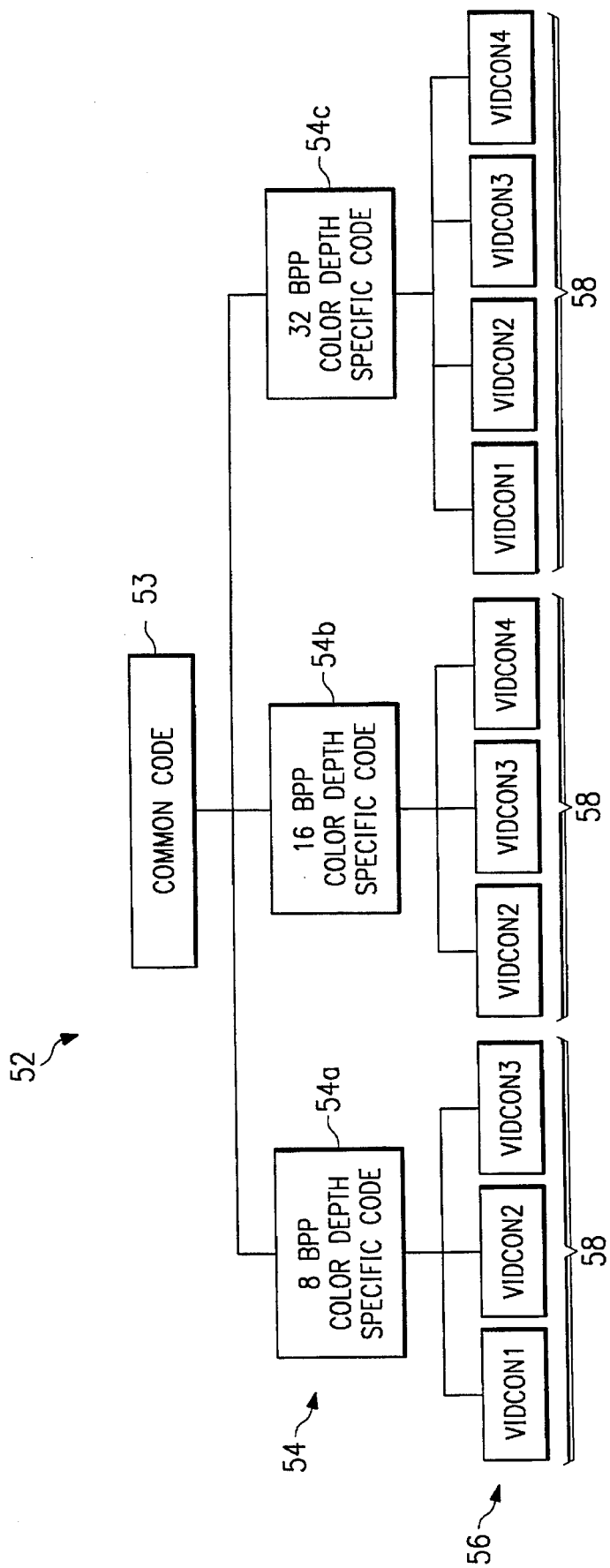
FIG. 3 illustrates a code hierarchy for the driver used in conjunction with the computer system and video controller of FIGS. 1 and 2.

For illustrative purposes, a hierarchy 52 of driver code is illustrated in FIG. 3. At the top of the hierarchy is the common code 53. This layer contains all code not related to colordepth or specific to a particular controller (hereinafter "device-specific"), and includes the initialization code, driver management code and drawing primitive code shared by all colordepth- and device-specific primitive routines.

Among other routines, the common code 53 contains the entry points in the driver software which will be accessed by the operating environment software, e.g. WINDOWS, in order to effect video operations. WINDOWS uses a known set of primitives for controlling the display. A number of the WINDOWS' primitives are mandatory, and the video driver must support these primitives. Other primitives are discretionary, and can be supported in order to accelerate video operations. In the preferred embodiment, each of the WINDOWS primitives has an entry point into the common code.

Next in the hierarchy is the colordepth-specific code layer 54. This layer is organized by colordepth and each section of code 54a–54c contains the code common to all device-specific primitives for that color depth. Hence, this code is common to all controllers operating within a specific color depth (so long as the controller allows access to its frame buffer). For example, hierarchy shows colordepth-specific code for color depths of 8 BPP, 16 BPP and 32 BPP. The 8 BPP colordepth specific code 54a can be used to control any controller in 8 BPP mode. As described in greater detail hereinbelow, the colordepth-specific code is able to operate any controller within its specific color depth because it is used only after a preliminary device-specific routine sets up the frame buffer memory mode to packed pixel mode, such that the frame buffer can be accessed as if it were a bitmap of known dimensions in memory.

The third layer is the device-specific layer 56. This layer contains any device-specific code implemented to accelerate primitives and is organized by video controller type (names for the controllers are set forth herein as VIDCON1, VIDCON2, VIDCON3, and so on, for identification purposes). There is a separate set 58 of device-specific code for each color depth supported by the video controller.

In operation, a WINDOWS primitive will access the common code at an entry point for that primitive. The common code will use an accelerated routine from the device-specific layer to execute the primitive if one is available. Other common code operations may also be performed to support the primitive. If an accelerated device-specific routine is not available, the video controller will be set in packed pixel mode (by a routine which is itself a device-specific routine—this routine is the only device-specific routine which must be available in order to use the driver with a controller). After setting the video controller in packed pixel mode, the colordepth-specific code corresponding to the primitive is executed. Again, common code operations may be performed either before or after the colordepth-specific code.

In the preferred embodiment, a vector table is used to point the common code to device-specific routines to execute accelerated functions of the video controller when such routines are available or, alternately, to point the common code to a routine which sets the video controller in the proper mode (packed pixel mode) for effecting the WINDOWS-requested primitive using the colordepth-specific code and notifying the common code that the accelerating device-specific code was unavailable. Initially, upon loading the driver, all entries point to a routine (StubDeviceRoutine) which sets the controller in packed pixel mode. An exemplary initial vector table is provided below:

Initial Vector Table

Figure 4:
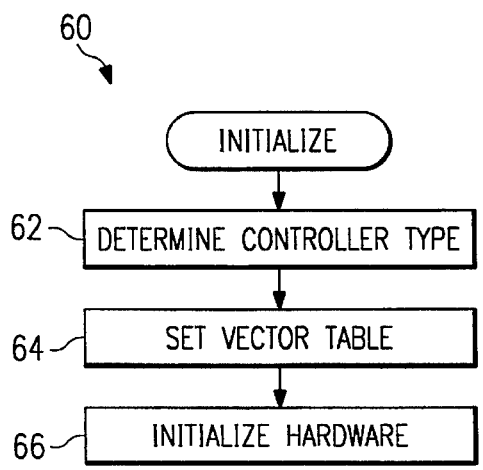
FIG. 4 illustrates a flow chart describing initialization of the video driver.

DEVICE_RECTANGLE=StubDeviceRoutine;

DEVICE_CIRCLE=StubDeviceRoutine;

DEVICE_LINE=StubDeviceRoutine;

DEVICE_BITBLT=StubDeviceRoutine;

The initialization 60 of the driver upon loading is described in connection with FIG. 4. In block 62, the driver determines the specific controller used in the computer. Most controllers can be identified by accessing registers on the video controller. Once identified, the vector table is initialized by modifying the entries to point to device-specific routines, where available, in block 64. For example, if a particular controller supported accelerated rectangle drawing, the vector entry "DEVICE_RECTANGLE=StubDeviceRoutine" could be modified to "DEVICE_RECTANGLE=Vidcon1_Fast_Rectangle", where "Vidcon1_Fast_Rectangle" identified the device-specific routine for hardware accelerated rectangle drawing for the VIDCON1 video controller. Entries without a corresponding device-specific routine are not changed. After setting the vector table, other hardware initialization takes place in block 66, such as setting the controller for memory-mapped I/O.

Figure 5:
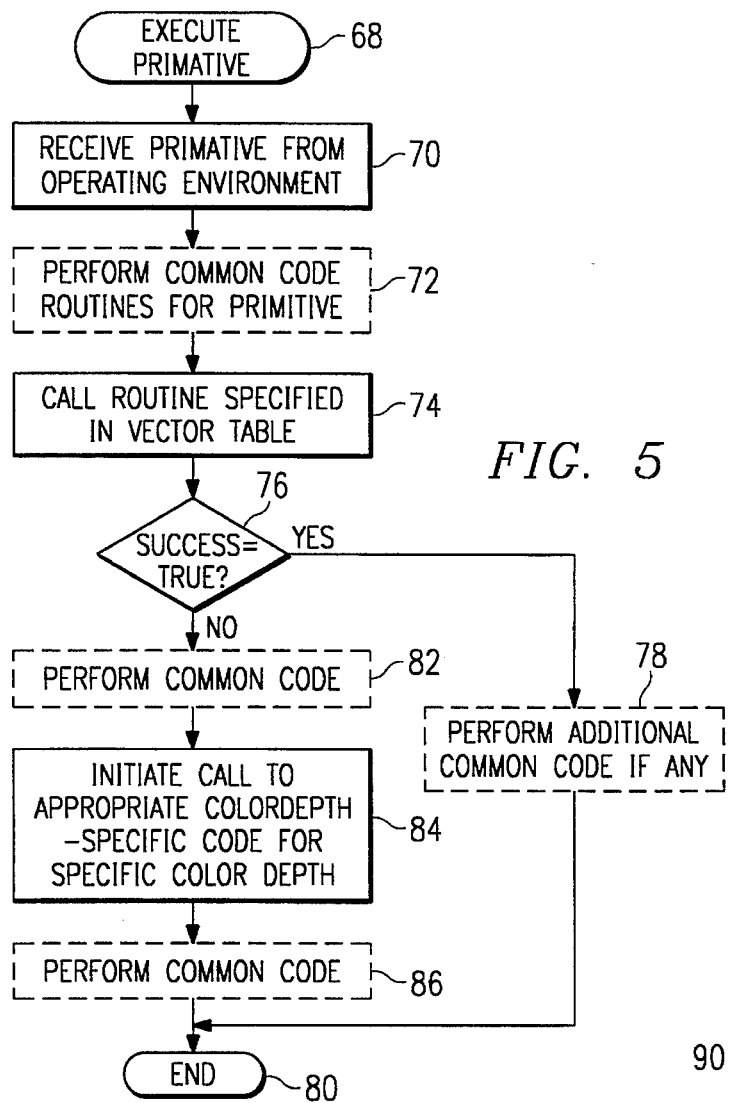
FIG. 5 illustrates a flow chart describing execution of a primitive from the operating environment.

FIG. 5 is a flow chart illustrating the general operation of the video driver in response to a primitive received from the operating environment. In block 70, video driver "receives" a primitive from the operating environment. In WINDOWS, the primitive is initiated by entering the VIDEO driver at an entry point corresponding to the primitive. These entry points are communicated to WINDOWS upon loading of the video driver. Responsive to the WINDOWS' primitive, common code routines, if any, from the common code layer 54 are executed in block 72. For a given primitive, there may or may not be common code routines. In block 74, the common code calls a routine associated with the primitive by reference to the vector table. If the routine specified by the vector table is an accelerating device-specific routine, then the SUCCESS flag will set to TRUE. If not, the SUCCESS flag is set to FALSE. Block 74 is described in greater detail in connection with FIG. 6. In decision block 76, the SUCCESS flag is checked. If SUCCESS=TRUE, then additional common code, if any, is performed in block 78 and the execution of the WINDOWS' primitive is complete in block 80. If SUCCESS=FALSE in decision block 76, then additional common code may be performed in block 82, and a call to the appropriate colordepth-specific code is initiated in block 84 at the specific color depth. Thus, for example, if the controller is in 8 BPP mode, the call would be to the 8 BPP colordepth-specific code for the routine associated with the WINDOWS' primitive. In block 86, additional common code, if any, maybe performed and the execution of the primitive is complete in block 80.

Figure 6:
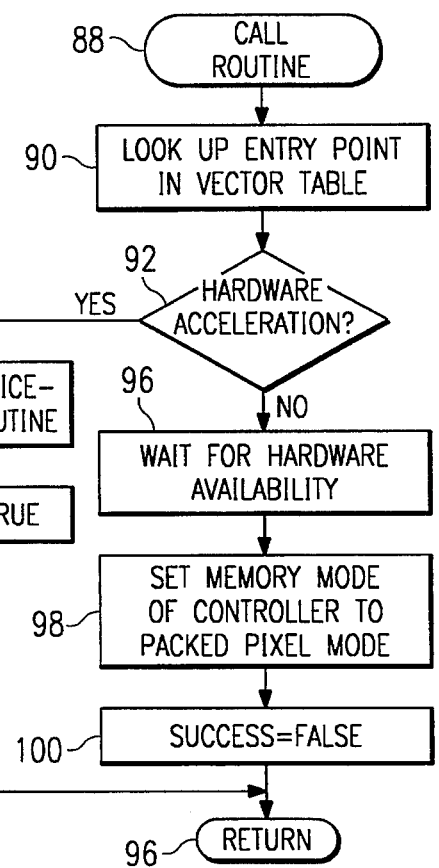
FIG. 6 illustrates a flow chart describing execution of a device-specific routine responsive to a primitive from the operating environment.

The call to the routine specified in vector table (block 74) is described in greater detail in connection with the call routine flow chart 88 of FIG. 6. In block 90, the common code calls a device-specific routine by reference to an entry point stored in the vector table. For example, if the WINDOWS' primitive was a "RECTANGLE()" primitive, the common code may call a subroutine named "DEVICE_ RECTANGLE". This entry point in the vector table may point to a routine which provides hardware acceleration for the primitive or may point to the code for changing the mode of the controller to packed pixel mode. In decision 92, if the vector table points to a hardware accelerated routine, then the device-specific routine associated with the hardware acceleration is executed in block 94. After the accelerated device-specific routine is executed, the SUCCESS flag is set to TRUE in block 95 and control reverts back to the common code in block 96. If a hardware-specific routine is not available in decision 92, i.e., the entry point specified in the vector table points to "StubDeviceRoutine" then a device-specific routine is executed which (1) waits until the video controller hardware is available in block 96, (2) sets the memory mode of the video controller to packed pixel mode in block 98, and (3) sets the SUCCESS flag to FALSE in block 100. Control returns to the common code in return block 96.

To use the driver with a previously unsupported video controller, only a single device-specific routine must be written. This routine sets the video controller in a mode in which it can be operated by the colordepth-specific code. In the preferred embodiment, the controller is placed in packed pixel mode, which allows the frame buffer to be accessed like a bitmap. Consequently, since all video controllers placed in this mode can be accessed identically, the colordepth-specific code works regardless of which controller is being used.

An exemplary pseudo-code routine for placing a video controller (VIDCON1) in the proper mode is set forth below:

```
VIDCON1_Set_HW()
    /*This routine is responsible for assuring that */
    /* the hardware is in a known default state where */
    /* it may be treated as a memory destination by */
    /* the colordepth-specific routines */
    IF (HARDWARE_USE==TRUE)
        WHILE (HARDWARE_AVAILABLE==FALSE)
            WAIT
        ENDWHILE
    END
    HARDWARE_STATE=PACKED PIXEL MODE
    HARDWARE_USE=FALSE
END
```

This default routine performs several functions. First, it waits until the hardware is no longer in use.

If the hardware is in use, execution of the colordepth code (or any other code) could cause errors as it accessed the video controllers frame buffer. Second, it sets the video controller to packed pixel mode (or other appropriate mode). Thereafter, the colordepth-specific code can be executed.

Once this device-specific default routine is written, the vector table can direct all primitive calls to the default routine and the already existing common and colordepth-specific code can perform all primitive operations on the associated controller. Thereafter, device-specific routines for the video controller's hardware acceleration features can be added, and the initialization routine can be modified such that the vector table is updated at runtime to point to those routines for specified function calls.

Figure 7:
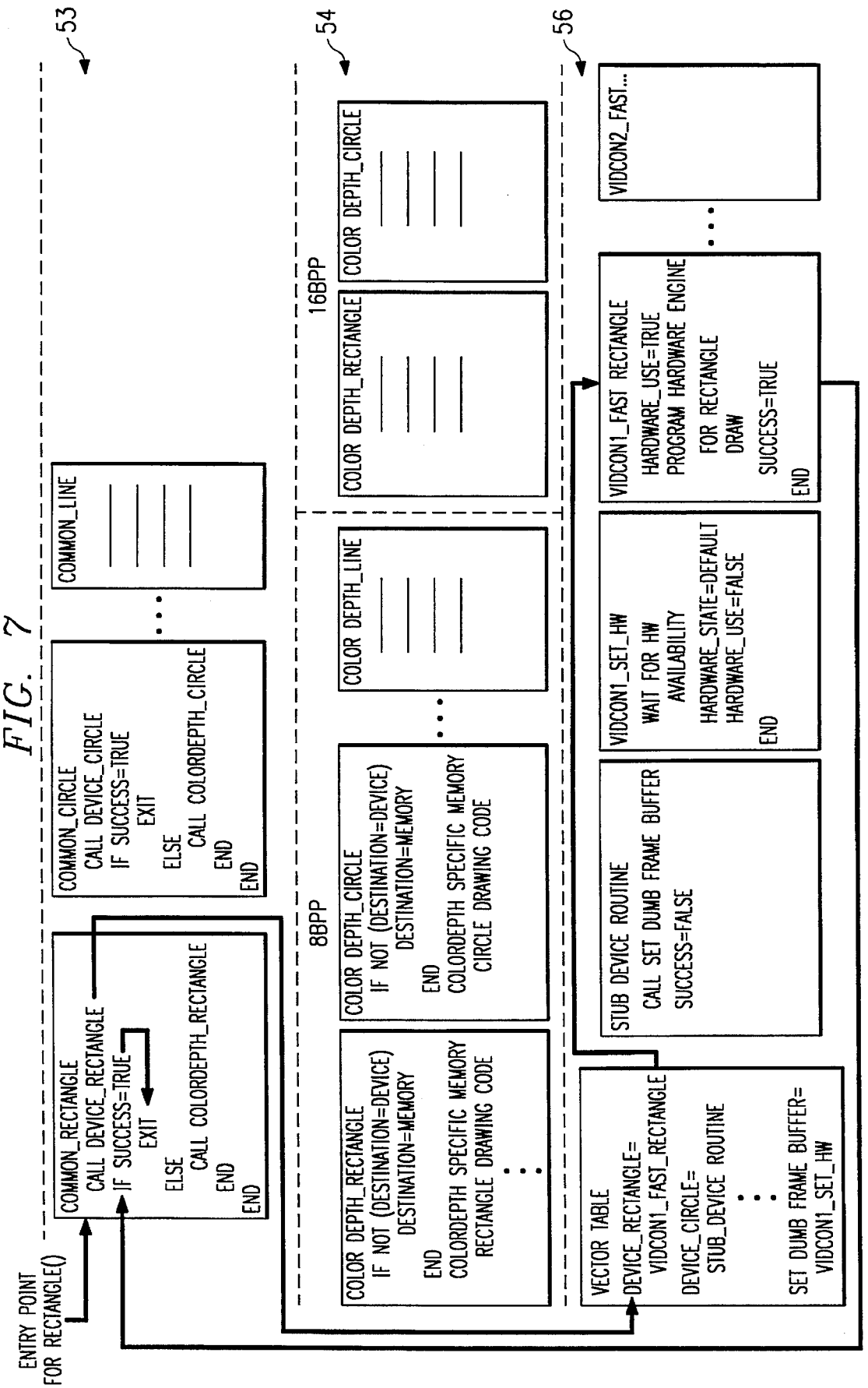
FIGS. 7 and 8 illustrate the flow of software control response to accelerated and non-accelerated commands, respectively.
Figure 8:
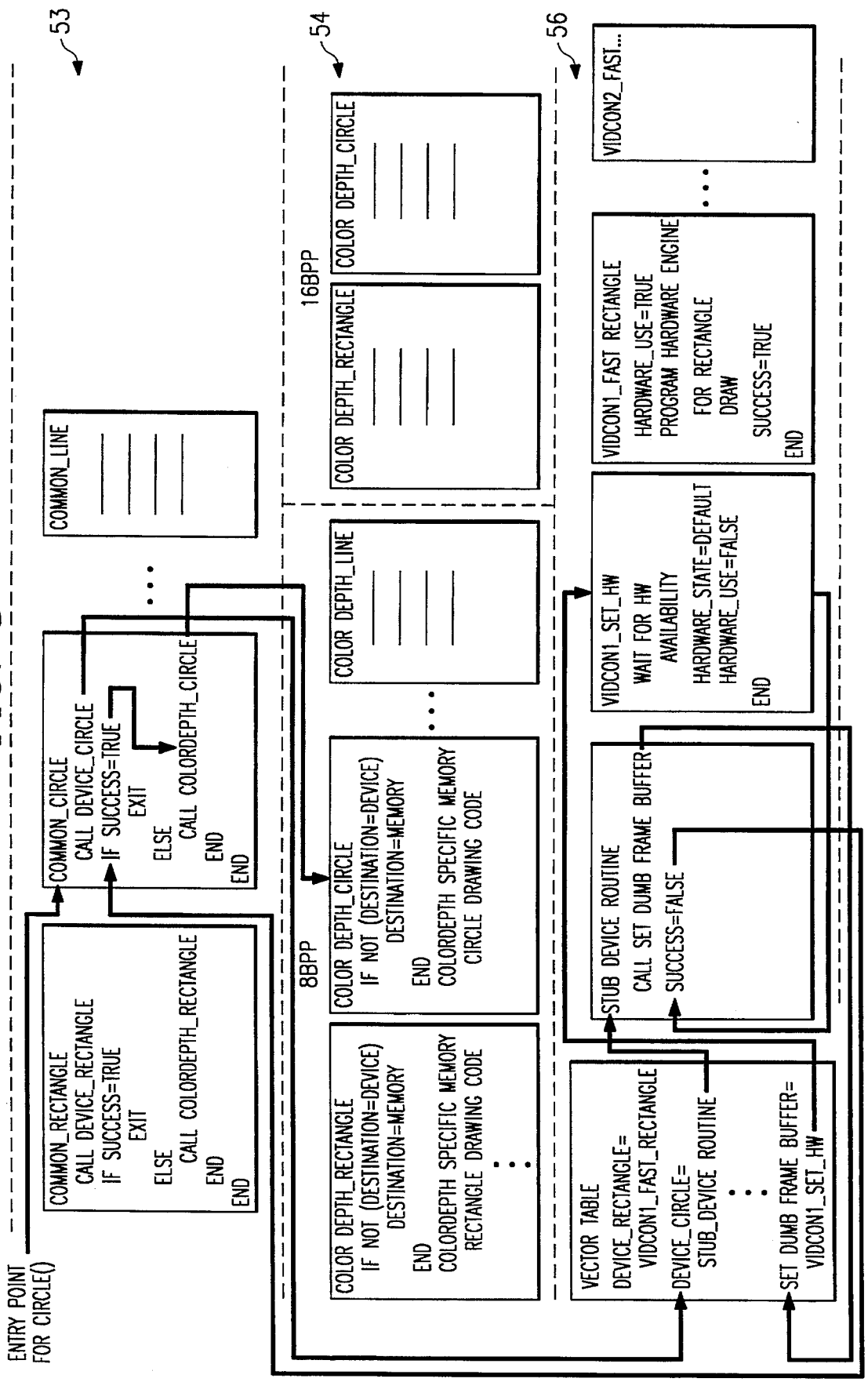

FIGS. 7 and 8 provide examples of the operation of the driver in response to (1) a primitive for which the driver has a hardware accelerated device-specific routine and (2) a primitive for which the driver does not have an accelerated device-specific routine. In FIG. 7, the operating environment executes a RECTANGLE() primitive, which enters the common code 53 at a routine shown as "COMMON_RECTANGLE". The first call of COMMON_RECTANGLE is to DEVICE_RECTANGLE which is referenced by the vector table as pointing to VIDCON1_FAST_RECTANGLE. The device-specific routine VIDCON1_FAST_RECTANGLE performs the hardware-assisted execution of the RECTANGLE() command and returns to the COMMON_RECTANGLE routine. The COMMON_RECTANGLE routine checks the SUCCESS flag to see if an accelerated routine was performed. Since, in this case, the SUCCESS flag has been set to TRUE, the COMMON_RECTANGLE routine is complete. For simplicity, any additional common code associated with COMMON_RECTANGLE is not shown.

FIG. 8 illustrates a primitive which does not have a device-specific routine for hardware acceleration. In this case, the CIRCLE() primitive accesses the common code 53 at the common code routine COMMON_CIRCLE. COMMON_CIRCLE, in turn, calls DEVICE_CIRCLE, which references the vector table. The vector table associates DEVICE_CIRCLE with StubDeviceRoutine. StubDeviceRoutine calls SetDumbFrameBuffer which is also defined in the vector table. In this case, SetDumbFrameBuffer points to VIDCON1_SET_HW. The vector table entry for SetDumbFrameBuffer is set upon loading of the driver in response to the identification of the video controller being used in the computer system. The VIDCON1_SET_HW routine performs the functions described above. It should be noted that the device-specific layer will have other similar routines for different controllers, one of which will be associated with SetDumbFrameBuffer at initialization. After completion of the VIDCON1_SET_HW routine, control returns to the StubDeviceRoutine which sets the SUCCESS flag to FALSE. Thereafter, control is returned to the COMMON_CIRCLE routine. Since SUCCESS=FALSE, the COMMON_CIRCLE routine calls a colordepth-specific routine to effect the CIRCLE() primitive. The COLORDEPTH—CIRCLE routine (which is associated with a specific color depth; in the illustrated figure, it is assumed the video controller is operating at 8 BPP) performs the operation, treating the video controller frame buffer as a memory bitmap.

It should be noted that the video driver in WINDOWS also performs the memory bitmap functions. Hence, the code associated with the colordepth-specific layer is substantially the code which is already necessitated by WINDOWS. Therefore, the code can be easily adapted to perform the colordepth-specific operations on the video controller without affecting the size of the video driver.

As can be seen from the foregoing, the present invention provides significant advantages over the prior art. First, once a base device driver comprising the common code 53 and colordepth-specific code 54 is created, it can be easily adapted to any video controller. Once the common code 53 and colordepth-specific code 54 is debugged, there is minimal code added to the driver for a specific video controller and, therefore, maintenance and support for the driver is greatly enhanced.

While the present invention has been specifically described in connection with WINDOWS, it should be noted that the driver described herein could be used with many different operating systems. Further, it should be noted that the organization of the various routines has been provided for illustrative purposes only, and other organizations, such as different color depths, could be easily supported. Consequently, while the present invention has been described in detail, various substitutions, modifications or alterations could be made to the description set forth above without departing from the invention which is defined by the following claims.

What is claimed is:

1. A method of communicating a plurality of primitive commands to a video controller having a configuration of a predetermined type, comprising the steps of:

generating a vector table linking a plurality of function calls to corresponding routines;

electronically determining said type of said configuration; and modifying the vector table responsive to said determined type of configuration such that certain of said function calls point to device-specific routines for performing hardware accelerated video operations and other of said function calls point to a routine for setting the video controller in a predetermined mode in which code specific to a specific color depth can execute video operations in the absence of a device-specific routine for a particular primitive command.

2. The method of claim 1 wherein said step of electronically determining said type of said configuration comprises polling a register associated with said configuration, wherein said register contains data identifying said type of said configuration.

3. The method of claim 1 and further comprising the steps of:

accessing the vector table responsive to a primitive command; and executing a routine specified by the vector table corresponding to the primitive command.

4. The method of claim 3 and further comprising the step of indicating whether the routine executed in said executing step initiated a hardware acceleration operation of the video controller.

5. The method of claim 4 and further comprising the step of executing code specific to a color depth associated with the video controller to complete execution of the primitive command.

6. The method of claim 5 wherein said video controller is one of a plurality of different types of video controllers, and wherein said step of executing code specific to a color depth comprises the step of executing a plurality of color depth operations, wherein each of said plurality of different video controllers types are responsive to said plurality of color depth operations.

7. The method of claim 5 and further comprising, before said step of executing color depth operations, the steps of:

determining whether said video controller is in a proper mode to respond to a color depth operation; and delaying said executing step until after said video controller is in a proper mode to respond to a color depth operation.

8. The method of claim 5 and further comprising, before said step of executing color depth operations, the step of placing said video controller into a predetermined memory access mode for responding to said color depth operations.

9. A computer system, comprising:

a display;

a video controller having a configuration of a predetermined type and for controlling said display;

control circuitry for:

generating a vector table linking a plurality of function calls to corresponding routines;

electronically determining said type of said configuration; and modifying the vector table responsive to said determined type of configuration such that certain of said function calls point to device-specific routines for performing hardware accelerated video operations and other of said function calls point to a routine for setting the video controller in a predetermined mode in which code specific to a specific color depth can execute video operations in the absence of a device-specific routine for a particular primitive command.

10. The computer system of claim 9 wherein said control circuitry further:

accesses the vector table responsive to a primitive command; and executes a routine specified by the vector table corresponding to the primitive command.

11. The computer system of claim 10 wherein said control circuitry further indicates whether the routine initiated a hardware acceleration operation of the video controller.

12. The computer system of claim 11 wherein said control circuitry further executes code specific to a color depth associated with the video controller to complete execution of the primitive command.

13. The computer system of claim 12 wherein said control circuitry further:

determines whether said video controller is in a proper mode to respond to a color depth operation; and delays said execution of the color depth operation until after said video controller is in a proper mode to respond to a color depth operation.

14. The computer system of claim 12 wherein the control circuitry further places said video controller into a predetermined memory access mode for responding to said color depth operations prior to execution of a color depth operation.

* * * * *

UNITED STATES PATENT AND TRADEMARK OFFICE
CERTIFICATE OF CORRECTION

PATENT NO. : 5,504,920
DATED : April 2, 1996
INVENTOR(S) : Kent E. Biggs, Mark A. Lobodzinski It is certified that error appears in the above-indentified patent and that said Letters Patent is hereby corrected as shown below:

Col. 4, lns. 35-36, between Line 35 and Line 36, insert

--...--.

Col. 4, ln. 47, delete

"DEVICE_RECTANGLE=Vidcon1_Fast_Rectangle", insert

--"DEVICE_RECTANGLE=Vidcon1_Fast_Rectangle" ,--.

Col. 6, ln. 55-56, delete "COLORDEPTH--CIRCLE", insert

--COLORDEPTH_CIRCLE--.

Signed and Sealed this

Thirteenth Day of August, 1996

*Attest:*

BRUCE LEHMAN

*Attesting Officer*     *Commissioner of Patents and Trademarks*